US008842623B2

(12) United States Patent
Ko et al.

(10) Patent No.: US 8,842,623 B2
(45) Date of Patent: Sep. 23, 2014

(54) METHOD AND APPARATUS FOR TRANSMITTING REFERENCE SIGNALS IN UPLINK MULTIPLE INPUT MULTIPLE OUTPUT (MIMO) TRANSMISSION

(75) Inventors: Hyun Soo Ko, Anyang-si (KR); Min Seok Noh, Anyang-si (KR); Jae Hoon Chung, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 13/379,644

(22) PCT Filed: Jun. 28, 2010

(86) PCT No.: PCT/KR2010/004180
§ 371 (c)(1),
(2), (4) Date: Dec. 20, 2011

(87) PCT Pub. No.: WO2010/151092
PCT Pub. Date: Dec. 29, 2010

(65) Prior Publication Data
US 2012/0093120 A1    Apr. 19, 2012

Related U.S. Application Data

(60) Provisional application No. 61/220,595, filed on Jun. 26, 2009.

(30) Foreign Application Priority Data

Jun. 28, 2010  (KR) ................. 10-2010-0061030

(51) Int. Cl.
*H04W 72/04*    (2009.01)
*H04B 7/06*    (2006.01)
*H04L 5/00*    (2006.01)
*H04L 27/26*    (2006.01)
*H04B 7/04*    (2006.01)

(52) U.S. Cl.
CPC .......... *H04B 7/0671* (2013.01); *H04L 27/2636* (2013.01); *H04L 27/2613* (2013.01); *H04L 5/0016* (2013.01); *H04L 5/0091* (2013.01); *H04B 7/0452* (2013.01); *H04B 7/063* (2013.01); *H04L 5/0023* (2013.01); *H04L 5/0053* (2013.01); *H04L 5/0048* (2013.01)
USPC ........................................ 370/329; 370/344

(58) Field of Classification Search
CPC .............. H04L 1/1671; H04L 27/2607; H04J 13/0062; H04J 13/0074; H04J 13/0059; H04J 13/12
USPC ......................... 370/329, 344; 375/260, 267
See application file for complete search history.

(56) References Cited

U.S. PATENT DOCUMENTS

| | | | |
|---|---|---|---|
| 2007/0248147 A1 | 10/2007 | Tiirola et al. | |
| 2008/0212702 A1* | 9/2008 | Pan et al. ...................... | 375/260 |
| 2008/0240281 A1 | 10/2008 | Gaal et al. | |
| 2008/0298433 A1* | 12/2008 | Tiirola et al. ................. | 375/132 |
| 2009/0046646 A1 | 2/2009 | Cho et al. | |
| 2009/0080569 A1* | 3/2009 | Han et al. ..................... | 375/316 |
| 2009/0279493 A1* | 11/2009 | Gaal et al. .................... | 370/329 |
| 2010/0135273 A1* | 6/2010 | Kim .............................. | 370/344 |
| 2010/0296465 A1* | 11/2010 | Hooli et al. .................. | 370/329 |

FOREIGN PATENT DOCUMENTS

| | | |
|---|---|---|
| JP | 2008236430 | 10/2008 |
| JP | 2011160396 | 8/2011 |
| WO | 2009056464 | 5/2009 |
| WO | 2009/078651 | 6/2009 |

OTHER PUBLICATIONS

Nokia Siemens Networks, et al., "UL DM RS for Multi-bandwidth Multi-user MIMO," 3GPP TSG RAN WG1 Meeting #51bis, R1-080293, XP050108814, Jan. 2008, 3 pages.
NTT DOCOMO, "UL RS Enhancement for LTE-Advanced," 3GPP TSG RAN WG1 Meeting #57bis, R1-092801, XP050351254, Jun. 2009, 5 pages.
Nokia Siemens Networks, et al., "Reference Signal Structure for LTE-Advanced UL SU-MIMO," 3GPP TSG RAN WG1 Meeting #57, R1-091772, XP050597401, May 2009, 6 pages.

European Patent Office Application Serial No. 10792374.0, Search Report dated Jan. 23, 2014, 9 pages.

The State Intellectual Property Office of the People's Republic of China Application Serial No. 201080028579.2, Office Action dated May 28, 2014, 14 pages.

3rd Generation Partnership Project, "Technical Specification Group Radio Access Network; Evolved Universal Terrestrial Radio Access (E-UTRA); Physical Channels and Modulation (Release 8)", 3GPP TS 36.211 V8.6.0, Mar., 2009, 83 pages.

\* cited by examiner

*Primary Examiner* — Jeffrey M Rutkowski
*Assistant Examiner* — Romani Ohri
(74) *Attorney, Agent, or Firm* — Lee, Hong, Degerman, Kang & Waimey

(57) ABSTRACT

The present invention relates to a wireless communication system, and more particularly, to a method and an apparatus for transmitting reference signals in uplink MIMO transmission. According to one embodiment of the present invention, the method for transmitting uplink signals through a terminal in the wireless communication system comprises the steps of: receiving control information including the information on a cyclic shift and/or an orthogonal cover code; allocating the multiplexed reference signals onto an uplink subframe; and transmitting the subframe through a multi-antenna. When the uplink MIMO transmission is multiuser MIMO transmission, the reference signals of the terminal and the reference signals of other terminals can be multiplexed by using the orthogonal cover code.

16 Claims, 6 Drawing Sheets

(a)

(b)

METHOD AND APPARATUS FOR TRANSMITTING REFERENCE SIGNALS IN UPLINK MULTIPLE INPUT MULTIPLE OUTPUT (MIMO) TRANSMISSION

This application is the National Stage filing under 35 U.S.C. 371 of International Application No. PCT/KR2010/004180, filed on Jun. 28, 2010, which claims the benefit of earlier filing date and right of priority to Korean Patent Application No. 10-2010-0061030, filed on Jun. 28, 2010, and also claims the benefit of U.S. Provisional Application Ser. No. 61/220,595, filed on Jun. 26, 2009, the contents of which are all hereby incorporated by reference herein in their entirety.

TECHNICAL FIELD

The following description relates to a wireless communication system and, more particularly, to a method and an apparatus for transmitting reference signals in uplink MIMO transmission.

BACKGROUND ART

MIMO (Multi Input Multi Output) is a communication system using a plurality of transmit antennas and a plurality of receiving antennas. The MIMO system may increase channel capacity linearly with the number of transmit and receiving antennas, without an additional increase in frequency bandwidth. There are two types of MIMO schemes, transmit diversity and spatial multiplexing. Transmit diversity increases transmission reliability by transmitting symbols in a plurality of channel paths, while spatial multiplexing increases transmission rate by transmitting different data streams simultaneously through a plurality of transmit antennas.

MIMO schemes may also be classified into open-loop MIMO and closed-loop MIMO depending on whether a transmitter has knowledge of channel information. Open-loop MIMO does not require that the transmitter is aware of channel information. In contrast, the transmitter has channel information in closed-loop MIMO. The performance of a closed-loop MIMO system depends on how accurate channel information the transmitter gets.

Channel information is information about radio channels between a plurality of transmit antennas and a plurality of receiving antennas (e.g. attenuation, a phase shift, a time delay, etc.). Many stream paths exists according to the combinations of the transmit and receiving antennas and channel status fluctuates over time in the time and frequency domains in view of a multipath time delay, which is called fading, in the MIMO system. Accordingly, a receiver calculates the channel information through channel estimation. Channel estimation is the process of estimating channel information required for recovering a distorted transmission signal. For example, the channel estimation is equivalent to estimation of the amplitude and reference phase of a carrier. In other words, the channel estimation is to estimate the frequency response of a radio link or a radio channel.

For channel estimation, a reference value may be estimated from several Reference Signals (RSs) received from the transmitter using a channel estimator. An RS is symbols transmitted at a high power level without carrying actual data to help channel estimation at the receiver. Both the transmitter and the receiver may perform channel estimation using RSs. Specifically, the RS-based channel estimation is to estimate a channel using symbols known to both the transmitter and the receiver and recover data based on the channel estimate. An RS is called a pilot signal.

In the meantime, 3rd Generation Partnership Project Long Term Evolution (3GPP LTE) systems are standardized in such a manner that a single antenna is used for uplink transmission from a User Equipment (UE) to a BS. A demodulation RS (DMRS) based on Cyclic Shift (CS) is defined in uplink single antenna transmission. However, 3GPP LTE-Advanced (LTE-A) systems are required to support multi-antenna transmission even for uplink transmission.

To support uplink MIMO transmission, an RS design scheme is needed which improves channel estimation performance for MIMO transmission while maintaining subframe design used for single antenna transmission supported by the LTE system and backward compatibility.

DISCLOSURE

Technical Problem

An object of the present invention devised to solve the problem lies on a scheme of efficiently designing a DMRS in uplink MIMO transmission, and a method and an apparatus for improving the efficiency of uplink MIMO transmission by using multiple cyclic shift resources and an orthogonal cover code.

Technical Solution

The object of the present invention can be achieved by providing a method for transmitting an uplink signal at a terminal in a wireless communication system, the method including: receiving control information including information on Cyclic Shift (CS); multiplexing reference signals for uplink Multiple Input Multiple Output (MIMO) transmission using at least one of the CS or an Orthogonal Cover Code (OCC); allocating the multiplexed reference signals onto an uplink subframe; and transmitting the subframe through multiple antennas, wherein the reference signals of the terminal and reference signals of other terminals are multiplexed using the OCC when the uplink MIMO transmission is multiuser MIMO transmission.

The values of CS may be allocated such that the spacing between CS values allocated to two or more ranks has a maximum value.

The reference signals may be precoded reference signals in the case of spatial multiplexing multi-antenna transmission.

The information on CS may include information on allocation of two CS resources in the case of multi-antenna transmission in a transmission diversity scheme.

Information on the OCC may be implicitly acquired by the terminal from the information on CS.

The information on the OCC may be received by the terminal through L1/L2 control signaling or higher layer signaling.

The control information may be included in a downlink control information format used for scheduling of physical uplink shared channels.

The reference signals may be Demodulation Reference Signals (DMRSs).

The object of the present invention can be achieved by providing a terminal transmitting an uplink signal in a wireless communication system, the terminal including: a plurality of antennas; a receiving module for receiving a signal from a Base Station (BS) through the plurality of antennas; a transmission module for transmitting a signal to the BS through the plurality of antennas; and a processor for controlling the terminal including the plurality of antennas, the receiving module, and the transmission module, wherein the processor is configured to receive control information including information on Cyclic Shift (CS) through the receiving module, to multiplex reference signals for uplink MIMO transmission using at least one of the CS values or an orthogonal cover code (OCC), to allocate the multiplexed reference signals onto an uplink subframe, and transmit the subframe through the transmission module and the multiple antennas, wherein the reference signals of the terminal and reference signals of other terminals are multiplexed using the OCC when the uplink MIMO transmission is multiuser MIMO transmission.

The values of CS may be allocated such that the spacing between CS values allocated to two ore more ranks has a maximum value.

The reference signals may bee precoded reference signals in the case of spatial multiplexing multi-antenna transmission.

The information on CS may include information on allocation of two CS resources in the case of multi-antenna transmission in a transmission diversity scheme.

Information on the OCC may be implicitly acquired by the terminal from the information on CS.

The information on the OCC may be received by the terminal through L1/L2 control signaling or higher layer signaling.

The control information may be included in a downlink control information format used for scheduling of physical uplink shared channels.

The reference signals may be Demodulation Reference Signals (DMRSs).

It will be appreciated by person skilled in the art that the objects that could be achieved with the present invention are not limited to what has been particularly described hereinabove and the above and other objects that the present invention could achieve will be more clearly understood from the following detailed description.

Advantageous Effects

According to embodiments of the present invention, it is possible to provide a DMRS which improves the efficiency of uplink MIMO transmission by using multiple cyclic shift resources and an orthogonal cover code.

It will be appreciated by persons skilled in the art that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
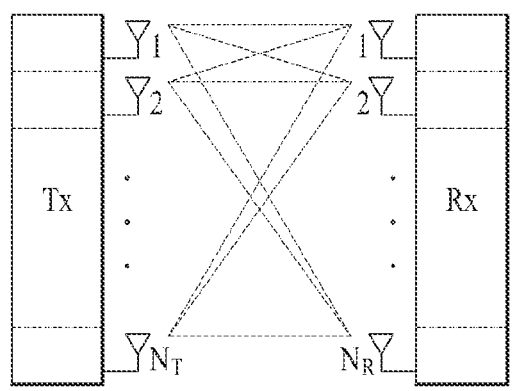
FIG. 1 shows the configuration of a wireless communication system having multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship among a Base Station (BS) and a User Equipment (UE). The BS is an end node of a network, which communicates directly with a terminal. In some cases, a specific operation described as performed by the BS may be performed by an upper node of the BS.

Namely, it is apparent that, in a network comprised of a plurality of network nodes including a BS, various operations performed for communication with a TERMINAL may be performed by the BS, or network nodes other than the BS. The term 'BS' may be replaced with the term 'fixed station', 'Node B', 'evolved Node B (eNode B or eNB)', 'Access Point (AP)', etc. The term "relay" may be used interchangeably with 'Relay Node (RN)', 'Relay Station (RS)', etc. The term 'terminal' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved-UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (Wireless-MAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

MIMO System Modeling

FIG. 1 shows the configuration of a wireless communication system using multiple antennas. As shown in FIG. 1, when the number of transmit antennas and the number of receiving antennas are increased to $N_T$ and $N_R$ respectively, a channel transmission capacity increases in proportion to the number of antennas in theory, distinguished from a case in which only transmitter or receiver uses multiple antennas. Accordingly, a transmission rate and frequency efficiency can be improved. The transmission rate can be increased by the product of a maximum transmission rate $R_0$ when a single antenna is used and a rate of increase $R_i$ represented by Equation 1 according to increase in the channel transmission capacity theoretically.

$$R_i = \min(N_T, N_R) \quad \text{[Equation 1]}$$

For example, a MIMO communication system using four transmit antennas and four receiving antennas can acquire a transmission rate four times the transmission rate of a single antenna system in theory. Since the theoretical capacity increase of the multi-antenna system was proved in the mid-90s, various techniques for improving a data transfer rate have been actively studied and some of the techniques are reflected in standards of wireless communications such as $3^{rd}$ generation mobile communication and next-generation wireless LAN.

MIMO related researches that have been performed so far involve information theory researches related to MIMO communication capacity calculation in various channel environments and multi-access environments, researches on radio channel measurement and modeling, researches on space-time signal processing techniques for improving transmission reliability and transmission rate, etc.

A communication scheme in the MIMO system will be described below using a mathematical model. It is assumed that there are $N_T$ transmit antennas and $N_R$ receiving antennas in the MIMO system.

Regarding a transmission signal, up to $N_T$ pieces of information can be transmitted through the $N_T$ transmit antennas, as expressed as the following vector.

$$s = [s_1, s_2, \ldots, s_{N_T}]^T \quad \text{[Equation 2]}$$

A different transmit power may be applied to each piece of transmission information $s_1, s_2, \ldots, s_{N_T}$. Let the transmit power levels of the transmission information be denoted by $P_1, P_2, \ldots, P_{N_T}$, respectively. Then the transmit power-controlled transmission information $\hat{s}$ may be given as [Equation 3].

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{s}$ may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Let's consider a case in which actual $N_T$ transmitted signals $x_1, x_2, \ldots, x_{N_T}$ are configured by applying a weight matrix W to the transmit power-controlled information vector $\hat{s}$. The weight matrix W functions to appropriately distribute the transmission information to the antennas according to transmission channel statuses, etc. These transmitted signals $x_1, x_2, \ldots, x_{N_T}$ are represented as a vector X, which may be determined as $$X = \begin{bmatrix} x_1 \\ x_2 \\ \vdots \\ x_i \\ \vdots \\ x_{N_T} \end{bmatrix}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

[Equation 5]

where $w_{ij}$ denotes a weight for a $j^{th}$ piece of information $\hat{s}_j$ transmitted through an $i^{th}$ transmit antenna. W is also referred to as a precoding matrix.

Given $N_R$ receiving antennas, signals received at the receiving antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of the transmit antennas and receiving antennas. A channel between a $j^{th}$ transmit antenna and an $i^{th}$ receiving antenna is represented as $h_{ij}$. It is to be noted herein that the index of the receiving antenna precedes that of the transmit antenna in $h_{ij}$.

Figure 2:
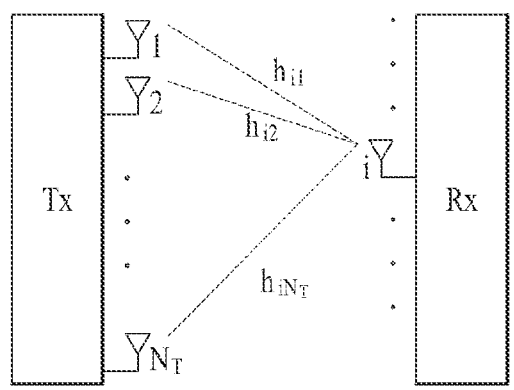
FIG. 2 shows channels from a transmit antenna to a receiving antenna.

FIG. 2 illustrates channels from $N_T$ transmit antennas to an $i^{th}$ receiving antenna. Referring to FIG. 2, the channels from the $N_T$ transmit antennas to the $i^{th}$ receiving antenna may be expressed as [Equation 7].

$$h_i^T = [h_{i1}, h_{i2}, \ldots, h_{iN_T}] \quad \text{[Equation 7]}$$

Hence, all channels from the $N_T$ transmit antennas to the $N_R$ receiving antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

Actual channels experience the above channel matrix H and then are added with Additive White Gaussian Noise (AWGN). The AWGN $n_1, n_2, \ldots, n_{N_R}$ added to the $N_R$ receiving antennas is given as the following vector.

$$n = [n_1, n_2, \ldots, n_{N_R}]^T$$ [Equation 9]

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The above description has been made focusing on a case in which the MIMO communication system is used for a single user. However, the MIMO communication system can be applied to a plurality of users to acquire multiuser diversity. This will be briefly described.

A fading channel is known as a main cause of deterioration of performance of a wireless communication system. A channel gain varies with time, frequency and space, and performance deterioration becomes serious as the channel gain decreases. Diversity, one of methods for overcoming fading, uses the fact that there is a very low probability that all independent channels have low gains. There are a variety of diversity schemes, one of which is multiuser diversity.

When there are multiple users in a cell, the users have stochastically independent channel gains, and thus the probability that all the channel gains are low is very low. According to information theory, on the assumption that a BS has sufficient transmit power, a total channel capacity can be maximized by allocating all channels to a user having a highest channel gain among the multiple users in the cell. The multiuser diversity can be classified into three schemes.

Temporal multiuser diversity is a scheme of allocating a channel to a user having a maximum channel gain whenever the channel varies with time. Frequency multiuser diversity is a scheme of allocating subcarriers to a user having a maximum gain in each frequency band in a frequency multicarrier system such as Orthogonal Frequency Division Multiplexing (OFDM).

If channels vary very slowly in a system using no multicarrier, a user having a maximum channel gain will exclusively occupy the channels for a long time. Accordingly, other users cannot perform communications. In this case, it is necessary to induce the channels to be varied in order to use the multiuser diversity.

Spatial multiuser diversity uses the fact that users have different channel gains according to spaces. An implementation example of the spatial multiuser diversity is Random Beamforming (RBF). The RBF is also called "opportunistic beamforming". The RBF induces channel variation by beamforming with an arbitrary weight at a transmitter using multiple antennas.

A description will be given of a Multiuser MIMO (MU-MIMO) scheme which applies the multiuser diversity to MIMO.

The MU-MIMO scheme enables various combinations of the number of users at the transmitter and receiver and the number of antennas of each user. The MU-MIMO scheme is divided into downlink (forward link) and uplink (referees link) which will be respectively described. The downlink means signal transmission from a BA to terminals and uplink means signal transmission from terminals to an BS.

In the case of downlink MU-MIMO scheme, one user can receive signals through $N_R$ antennas, and each of $N_R$ users can receive signals using one antenna in extreme examples. In addition, combinations of the two extreme examples are available. That is, a first user uses one receiving antenna whereas a second user uses three receiving antennas. It is noted that the total number of receiving antennas is $N_R$ in all cases. This is called MIMO Broadcast Channel (BC) or Space Division Multiple Access (SDMA).

In the case of uplink MU-MIMO scheme, one user can transmit signals through $N_T$ antennas and each of $N_T$ users can transmit signals using one antenna in extreme cases. Further, combinations of the two extreme examples are available. That is, a certain user uses one transmit antenna whereas another user uses three transmit antennas. It is noted that the total number of transmit antennas is maintained as $N_T$ in all cases. This is called MIMO Multiple Access channel (MAC). The uplink and downlink have a symmetrical relationship therebetween, and thus a technique used by one side can be used by the other side.

The number of columns and rows of a channel matrix H which indicates a channel state is determined by the number of transmit and receiving antennas. The number of columns in the channel matrix H equals to the number of receiving antennas, $N_R$, and the number of rows equals to the number of transmit antennas, $N_T$. That is, the channel matrix H corresponds to $N_R \times N^T$.

The rank of a matrix is defined as the minimum of the numbers of independent rows or columns. Accordingly, the rank of the matrix is not larger than the number of rows or columns. The rank of the channel matrix H, rank(H) is limited as follows.

$$\text{rank}(H) \leq \min(N_T, N_R)$$ [Equation 11]

If the matrix is eigen value-decomposed, its rank may be defined as the number of non-zero eigen values. Similarly, in case of Singular Value Decomposition (SVD), the rank may be defined as the number of non-zero singular values. In a physical sense, therefore, the rank of a channel matrix is the maximum number of different pieces of information that can be transmitted on given channels.

Reference Signal (RS)

In a wireless communication system, a packet is transmitted on a radio channel. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. This signal is called a pilot signal or a reference signal.

In case of data transmission and reception through multiple antennas, knowledge of channel states between transmit antennas and receiving antennas is required for successful signal reception. Accordingly, a reference signal should exist separately for each transmit antenna.

Multiplexing is to allocate RSs configured for different antennas to the same resource area. There are largely three multiplexing schemes, Time Division Multiplexing (TDM), Frequency Division Multiplexing (FDM), and Code Division Multiplexing (CDM). Among them, CDM is the process of multiplying different code resources allocated to different antennas by RSs for the different antennas in the frequency domain and allocating the products to the same radio resources (time/frequency resources).

Configuration of Uplink Reference Signal

Figure 3:
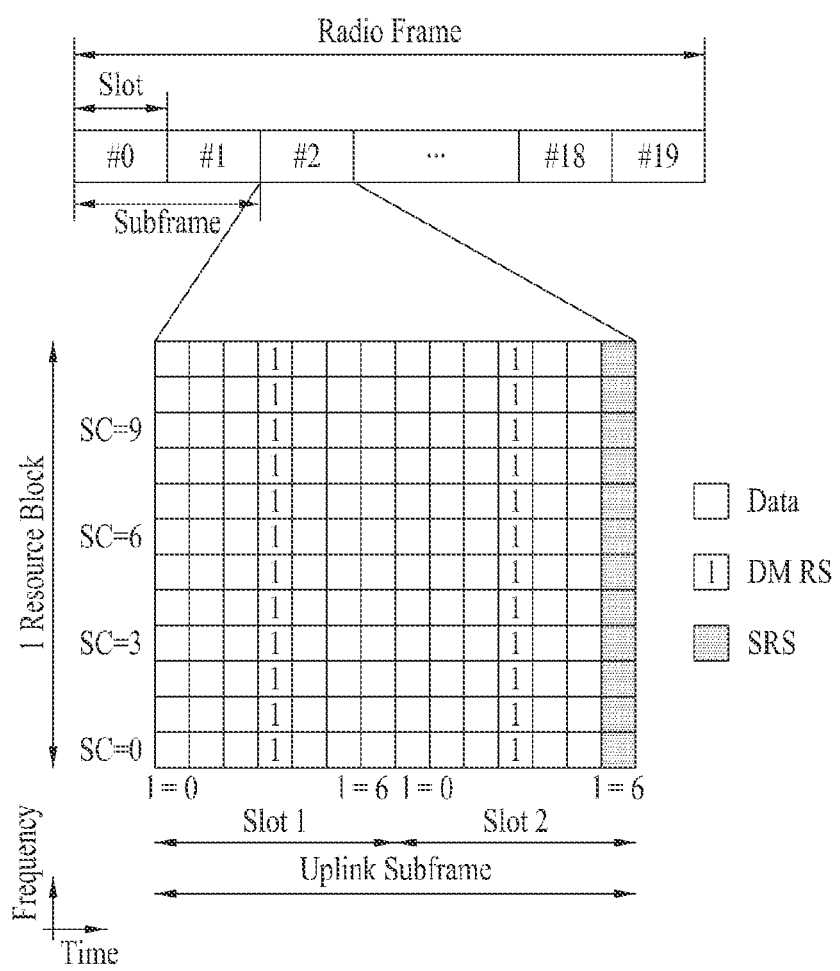
FIG. 3 shows the configuration of a 3GPP LTE uplink reference signal.

FIG. 3 shows the configuration of an uplink RS of 3GPP LTE.

Referring to FIG. 3, a radio frame includes ten subframes. A subframe includes two slots. A time for transmitting one subframe id defined as a Transmission Time Interval (TTI). In the 3GPP LTE, one subframe may have a length of 1 ms and one slot may have a length of 0.5 ms. However, the structure of the radio frame and TTI may be varied according to a communication system.

One slot includes a plurality of SC-FDMA symbols in the time domain and includes a plurality of resource blocks in the frequency domain. For one resource block, the horizontal axis thereof represents time axis and vertical axis thereof indicates frequency axis. In the case of normal CP, each slot includes seven symbols. In the case of extended CP, each slot includes six symbols. The extended CP is generally used in an environment having a long delay. In a Single Carrier-Frequency Division Multiple Access (SC-FDMA) system, an RS uses all resources of one symbol in order to satisfy the single carrier property. In the 3GPP LTE system, an RS is not precoded on the uplink, distinguished from data, and includes a Demodulation RS (DMRS) and a Sounding RS (SRS). The DMRS is a reference signal for acquiring channel information for demodulation of uplink data and the SRS is a reference signal used for measurement of uplink channels. FIG. 3 shows locations of a DMRS and an SRS in the case of normal CP. The DMRS is allocated to I=3 of slots 1 and 2 and indicated as '1'. The SRS is allocated to I=6. Data is allocated to the remaining resource elements. As shown in FIG. 3, One OFDM (or SC-FDMA) symbol in one slot is used to transmit a DMRS. That is, one subframe includes two slots, data is transmitted on the basis of one subframe as a basic unit, and one subframe is allocated with two DMRSs. Two slots existing in one subframe may be located at the same frequency or located at different frequencies. Accordingly, the DMRS may have the same frequency or different frequencies in the first slot and the second slot. The DMRSs existing in the two slots use the same sequence.

A DMRS sequence and an SRS sequence may be generated using a Constant Amplitude Zero Autocorrelation Waveform (CAZAC) sequence. The CAZAC sequence may be a Zadoff-Chu (ZC) sequence, for example. Various ZC sequences can be generated according to a root index and a cyclic shift index. That is, a root index or cyclic shift index can be a seed value of the ZC sequence. DCI format 0 which is control information for uplink data transmission includes a cyclic shift index. A BS can estimate channels from a plurality of terminals through an orthogonal (or quasi-orthogonal) sequence by allocating different cyclic shift indexes to the terminals.

The length of a DMRS sequence equals to the number of subcarriers of an allocated resource block. A DMRS for a Physical Uplink Shared Channel (PUSCH) is cyclic-shifted. In the LTE system, one slot has one Cyclic Shift (CS) value. The cyclic shift $\alpha$ in a slot $n_s$ is determined based on Equation 12. RSs from different terminals in one cell can be multiplexed using CS.

$$\alpha = 2\pi n_{cs}/12 \quad \text{[Equation 12]}$$

$$n_{cs} = (n_{DMRS}^{(1)} + n_{DMRS}^{(2)} + n_{PRS}(n_s)) \bmod 12$$

where $n_{DMRS}^{(1)}$ is cell-specifically given according to a parameter cyclicShift provided by higher layers. Table 3 illustrates exemplary mapping of the parameter cyclicShift to $n_{DMRS}^{(1)}$ values. In Equation 12, $n_{DMRS}^{(2)}$ is defined by a cyclic shift for a DMRS field of Downlink Control Information (DCI) format 0 received most recently for a transmission block associated with PUSCH transmission and terminal-specifically given. Table 2 illustrates exemplary mapping of the cyclic shift field in DCI format 0 to $n_{DMRS}^{(2)}$ values. In Equation 12, $n_{PRS}$ is a value given by a pseudo-random sequence and has a pattern hopping to a slot level. The pseudo-random sequence is cell-specifically applied.

TABLE 1

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

TABLE 2

| DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

Uplink DMRS Transmission Using Multiantenna

While the following exemplary embodiment of the present invention is described using the LTE-A system, it is noted that it can be applied to any MIMO system according to the same principle.

In the 3GPP LTE system, a terminal supports only one antenna. Accordingly, one antenna is used for the uplink of the LTE system. However, since even the uplink supports MIMO in the LTE-A system, a DMRS used for the uplink needs to be extended. For extension of a DMRS depending on an MIMO environment, a non-precoded DMRS and a pre-coded DMRS may be considered. The non-precoded DMRS requires as many DMRS patterns as the number of antennas as does the conventional downlink. That is, the DMRS pattern should be defined on the basis of the number of antennas, which can be supported by the system. In the case of the precoded DMRS, channel information measured at an antenna is multiplied by a precoding matrix and a DMRS pattern is applied to a rank corresponding to a virtual antenna domain, and thus DMRS overhead can be reduced even when the number of antennas increases. That is, the DMRS pattern of the precoded DMRS should be defined on the basis of the number of ranks supported by the system. For example, when the number of uplink transmit antennas, which can be supported by the system, is 1, 2 and 4, the non-precoded DMRS needs to define three patterns and the precoded DMRS needs to define patterns for ranks 1, 2, 3 and 4. The following description is given focusing on a case in which the number of uplink transmit antennas is four. However, the following exemplary embodiment of the present invention can be applied to any system using a plurality of transmit antennas.

As described above, a DMRS based on a single CS is defined for uplink transmission in the LTE system based on single antenna transmission. It is possible to consider a method of applying multiple CS resources to a DMRS as a method for supporting uplink MIMO transmission in the LTE-A system while maintaining backward compatibility. A DMRS for each layer (or antenna port) can be code-division-multiplexed using multiple CS resources and transmitted through the same radio resource. At this time, efficient allocation of CS resources is important in order to support uplink MIMO transmission using multiple CS resource. A detailed description will be given of the number of CS resources, which is required for each uplink MIMO transmission mode, CS resource separation, and application of an Orthogonal Cover Code (OCC).

Required Number of Cyclic Shift Resources

A variety of transmission schemes for uplink MIMO transmission using up to four transmit (Tx) antennas have been proposed. The number of CS resources for a DMRS depends on a transmission scheme. Table 3 illustrates the number of CS resources, required for various transmission diversity schemes, and Table 4 illustrates the number of CS resources required for various spatial multiplexing schemes.

TABLE 3

|  | 2Tx | 4Tx |
| --- | --- | --- |
| 1 cyclic shift | Slot based PVS, small delay CDD | Slot based PVS, Small delay CDD |
| 2 cyclic shift | STBC, SFBC, FSTD, Large delay CDD, | STBC-CDD, SFBC-CDD, FSTD-CDD |
| 4 cyclic shift |  | STBC-FSTD, SFBC-FSTDFSTD, Large delay CDD |

TABLE 4

|  | 2Tx | 4Tx |
| --- | --- | --- |
| 1 cyclic shift | Rank 1 SM with precoded DMRS | Rank 1 SM with precoded DMRS |
| 2 cyclic shift | Rank 2 SM with precoded DMRS(Using identity matrix) | Rank 2 with precoded DMRS |
| 3 cyclic shift | — | Rank 3 SM with precoded DMRS |
| 4 cyclic shift | — | Rank 3 SM with non-precoded DMRSRank 4 SM with precoded DMRS(Using identity matrix) |

Among transmission schemes applicable as a 2 Tx transmission diversity scheme, slot based Precoding Vector Switching (PVS) and small delay Cyclic Delay Diversity (CDD) may require one CS resource for a DMRS. Space Time Block Coding (STBC), Space Frequency Block Coding (SFBC), Frequency Switching Transmit Diversity (FSTD) and large delay CDD may require two CS resources for a DMRS.

Among transmission schemes applicable as a 4 Tx transmission diversity scheme, slot based PVS and small delay CCD may require one CS resource for a DMRS, STBC-CDD, SFBC-CDD and FSTD-CDD may need two CS resources for a DMRS, and STBC-FSTD, SFBC-FSTD, FSTD and large delay CDD may require four CS resources for a DMRS.

An appropriate number of CS resources can be determined in consideration of LTE design requirements of limitations on the output power of OFDM symbols in an uplink subframe and allocation of only one symbol per slot for DMRS transmission. Considering that a lower Peak Power to Average Ratio PAPR is required due to restricted power of a terminal and a high diversity gain is needed in terms of the necessity of reinforcing link quality and reducing terminal transmit power, transmission diversity schemes propose supporting up to two CS resources for both 2 Tx antenna and 4 Tx antenna.

In the meantime, in the uplink spatial multiplexing scheme, it is significant which one of the non-precoded DMRS and precoded DMRS is used. It was proposed that the precoded DMRS be used in the spatial multiplexing scheme for transmission of ranks 1, 2 and 4, as shown in Table 4. To determine which one of the non-precoded DMRS and precoded DMRS is used for rank-3 transmission, a required number of CS resources and complexity of calculation for acquiring pre-coded channel information can be considered.

In the case of a precoded DMRS, the required number of CS resources is determined by a transmission rank value instead of the number of uplink transmit antennas. Accordingly, three CS resources are required for rank-3 transmission. Furthermore, when the precoded DMRS is applied, precoded channel information can be directly acquired.

In the case of a non-precoded DMRS, the required number of CS resources equals to the number of uplink transmit antennas. For the non-precoded DMRS, enhanced calculation is needed to acquire precoded channel information. Although it is possible to consider a method of using only two CS resources for ranks 3 or more through multiplexing using two CS resources and additional multiplexing using an Orthogonal Cover Code (OCC) in the non-precoded DMRS scheme, this method is disadvantageous since it requires scheduling restriction (that is, non-slot hopping PUSCH).

Considering application of the precoded DMRS to other spatial multiplexing schemes, it is natural for the precoded DMRS to be applied to a spatial multiplexing scheme for rank-3 transmission. Further, the precoded DMRS may be advantageous for ease of system implementation. Accordingly, it is suggested that the precoded DMRS is applied to the spatial multiplexing scheme for rank-3 transmission.

Cyclic Shift Resource Allocation

CS separation can be considered to be a main multiplexing scheme in DMRS multiplexing. In channel estimation based on CDM, it is possible to accomplish more satisfactory channel estimation performance by allocating spaced CS resources to layers or transmit antennas. For example, CS resource separation can be set to 12/N (here, 12 indicates the number of CS values for a DMRS and N denotes the number of ranks) in order to maintain a maximum distance between CS resources according to a transmission rank.

If one terminal performs rank-2 uplink transmission, channels for a first layer and a second layer can be discriminated from each other using DMRS sequences (e.g., ZAZAC sequences) for the first layer and the second layer.

In the case of Single User-MIMO (SU-MIMO), if a CS value for one layer is designated, CS values for other layers can be allocated according to a predetermined increment. For example, when CS values are allocated to layers for rank 2, if a CS value for a first layer is designated as 4, as given by Table 2, 10, spaced from the first layer by 6 (12/2), can be allocated as a CS value for a second layer.

In the case of MU-MIMO, different CS values can be allocated using CS indication bits in a DCI format for uplink transmission. In MU-MIMO, spaced CS resources are required to be allocated between layers of each terminal since terminals have different timing offsets. Accordingly, it is necessary to allocate CS resources to multiple users each having multiple layers more cautiously.

When CS resources are allocated to multiple users having different transmission ranks, a fixed increment rule cannot ensure spacing CS resources among the multiple users. Accordingly, CS allocation according to a variable increment can be considered for flexibility of CS resource allocation.

Orthogonal Cover Code

In DMRS multiplexing, orthogonal cover code (OCC) separation among slots is considered to be a complementary multiplexing scheme. That is, the OCC can be used to increase the capacity of uplink RS resources.

A DMRS (cyclic shifted DMRS) is mapped to one symbol in each of two symbols which form one subframe (refer to FIG. 3). DMRSs mapped to two symbols are spread by using a length-2 orthogonal sequence for the two symbols, which is called orthogonal covering.

The OCC can be used to identify DMRSs for multiple users. For example, when the BS allocates a sequence with CS #0 to a terminal through DCI format 0, the sequence with CS #0 is used for DMRSs of the first and second slots. Here, a positive sign (+) or a negative sign (−) can be allocated to the DMRS sequence of the second slot. If a first user is allocated with CS #0 and a positive-signed OCC (+) and a second user is allocated with CS #0 and a negative-signed OCC (−), DMRSs of the two users can be distinguished from each other by means of the OCCs. At this time, since the DMRSs use the same CS resource, the capacity of DMRS resources can be doubled. In the case of an operation using a non-slot hopping PUSCH, the capacity of resources can be doubled by applying length-2 orthogonal sequence based OCCs to 8 or 12 CS resources. The length-2 orthogonal sequence may be a length-2 Walsh sequence (1, 1) and (1, −), for example. To increase the capacity of uplink RS resources by means of OCCs, the type of a used OCC can be indicated by allocating an OCC bit field to a control signal for data demodulation. For example, when 1 bit is allocated to an OCC indicator 1, OCC indicators '0' and '1' may have the following configuration.

TABLE 5

| OCC indicator | First slot | Second slot |
|---|---|---|
| 0 | 1 | 1 |
| 1 | 1 | −1 |

Further, the bit field included in the control signal when OCCs are applied to DMRSs may be defined as shown in Table 6.

TABLE 6

| Orthogonal Cover Code | 1 bit |
|---|---|
| Cyclic Shift value for DMRS | 3 bits |
| Additional bit field for multi-antenna/layer | 0~3 bits |

OCCs may be used to increase the spacing between CSs allocated to multiple antennas (or layers or streams) of a single user.

Different channels are identified by different uplink RSs. In a multi-antenna system, different CS resources may be allocated to different antennas (or layers or streams) to distinguish the antennas (or layers or streams) from one another. Channel estimation performance is improved as the spacing between CS resources increases. As the number of antennas (or layers or streams) increases, the number of CS resources to be allocated to the antennas (or layers or streams) also increases. The resulting reduction of the spacing between CSs may decrease the channel estimation performance. To avert this problem, an OCC may be applied to each antenna (or layer or stream). If DMRSs of two slots have the same frequency, the spacing between CSs increases by means of OCCs.

For example, on the assumption that CS indexes are given as shown in Table 2, if for four antennas, CSs 0, 6, 3 and 9 are respectively allocated, the spacing between the CSs for the antennas is 3. Here, DMRSs corresponding to third and fourth antennas are allocated with a negative-signed OCC (−). If length-N sequences with CS #0 are indicated by $(S_{01}, \ldots, S_{0N})$, $(S_{01}, \ldots, S_{0N})$, $(S_{61}, \ldots, S_{6N})$, $(S_{31}, \ldots, S_{3N})$, $(S_{91}, \ldots, S_{9N})$ are allocated to the DMRS of the first slot. If the DMRS of the second slot uses a negative-signed OCC (−), $(S_{01}, \ldots, S_{0N})$, $(S_{61}, \ldots, S_{6N})$, $(-S_{31}, \ldots, -S_{3N})$, $(-S_{91}, \ldots, -S_{9N})$ are allocated to the DMRS of the second slot. When the DMRSs of the two slots are summed, only the sequences $(S_{01}, \ldots, S_{0N})$, $(S_{61}, \ldots, S_{6N})$ remain with a CS spacing of 6. Likewise, subtraction of the DMRS of the two slots results only in the sequences $(S_{31}, \ldots, S_{3N})$, $(S_{91}, \ldots, S_{9N})$ with a CS spacing of 6. Therefore, the channel estimation performance can be increased since the spacing between CSs is increased to 6.

For SU-MIMO, OCCs can increase the spacing between CSs according to inter-layer cancellation. However, this advantage can be used only when there is a channel estimator which performs a successive inter-layer cancellation (SIC) operation.

OCCs may be used to increase the spacing between CSs allocated to multiple users.

CSs and OCCs may be allocated in consideration of MU-MIMO using multiple antennas. For example, highly dispersive CSs may be allocated to a plurality of antennas (or layers) from the viewpoint of a single user. CS allocation can be performed according to the above-described various methods. From the viewpoint of multiple users, however, the spacing between CSs of users may be narrowed. This problem can be overcome by means of OCCs. When OCCs are applied, the same CS value may be allocated to a plurality of users according to an OCC type.

Table 7 illustrates an example of applying OCCs to MU-MIMO.

TABLE 7

| | 1$^{st}$ Slot | | 2$^{nd}$ Slot | |
|---|---|---|---|---|
| UE 1 | C1 | C3 | C1 | C3 |
| UE 2 | C2 | C4 | −C2 | −C4 |

It is assumed that two terminals respectively transmit two layers through MU-MIMO. In this case, the BS is considered to receive four layers including the two layers from a first terminal and the two layers from a second terminal, and thus the BS is required to recover data corresponding to the respective layers using four different DMRSs.

The two layers from the first terminal can be multiplexed using different CS resources C1 and C3. The C1 and C3 can be respectively given CS indexes 0 and 6, for example, to maximize the spacing between the CS resources. The two layers from the second terminal can be multiplexed using different CS resources C2 and C4. The C2 and C4 can be respectively given CS indexes 3 and 9, for example, to maximize the spacing between the CS resources.

The first and second terminals can be multiplexed using OCCs. OCCs can be applied to two consecutive slots of one subframe. OCCs {1, 1} can be applied to the first terminal and OCCs {1, −1} can be applied to the second terminal. Accordingly, C2 and C4 corresponding to DMRS transmission symbols of the second slot of the second terminal are multiplied by −1.

If length-N sequences with CS index k are indicated by (S_Ck__1, ..., S_Ck_N), (S_C1__1, ..., S_C1_N), (S_C2__1, ..., S_C2_N), (S_C3__1, ..., S_C3_N), (S_C4__1, ..., S_C4_N) can be applied to DMRSs of the first slot and (S_C1__1, ..., S_C1_N), (−S_C2__1, ..., −S_C2_N), (S_C3__1, ..., S_C3_N), (−S_C4__1, ..., −S_C4_N) can be applied to DMRSs of the second slot.

A description will be given of an operation of the BS for channel estimation by identifying DMRSs for different layer signals from the respective terminals. The BS can receive (S_C1__1, ..., S_C1_N), (S_C3__1, ..., S_C3_N) which are obtained by adding up sequences corresponding to DMRS transmission symbols of the first and second symbols to erase sequences using the C2 and C4. The result (S_C1__1, ..., S_C1_N), (S_C3__1, ..., S_C3_N) obtained by the BS corresponds to the DMRSs of the first terminal. The two layers of the first terminal can be distinguished from each other by means of the different CS resources C1 and C3. In addition, the BS can receive (S_C2__1, ..., S_C2_N), (S_C4__1, ..., S_C4_N) which are obtained by performing subtraction of the sequences corresponding to the DMRS transmission symbols of the first and second symbols to erase sequences using the C1 and C3. The result (S_C2__1, ..., S_C2_N), (S_C4__1, ..., S_C4_N) obtained by the BS corresponds to the DMRSs of the second terminal. The two layers of the second terminal can be distinguished from each other by means of the different CS resources C2 and C4.

This MU-MIMO scheme using OCCs can remarkably reduce interferences among multiple users.

Whether or not an OCC is used can be indicated to a specific terminal by defining an OCC indication bit through L1/L2 signaling (e.g., a predetermined PDCCH or a PUSCH in the form of a MAC message) or higher layer signaling (e.g., RRC signaling). Otherwise, whether or not an OCC is used can be indicated to a specific terminal through new interpretation of other parameters of L1/L2 signaling.

Alternatively, whether or not an OCC is used can be indicated to a specific terminal without using additional L1/L2 signaling and/or RRC signaling. For instance, an OCC can be indicated to the TERMINAL using a DMRS field of DCI format 0 which informs the terminal of a CS index. That is, the specific terminal can be informed of CS resources allocated thereto with information on whether OCCs are used, and can recognize that OCCs are used when reserved CS resources (e.g., 1, 5 and 7) or unused CS indexes (e.g., −2 and −4) are allocated thereto.

Figure 4:
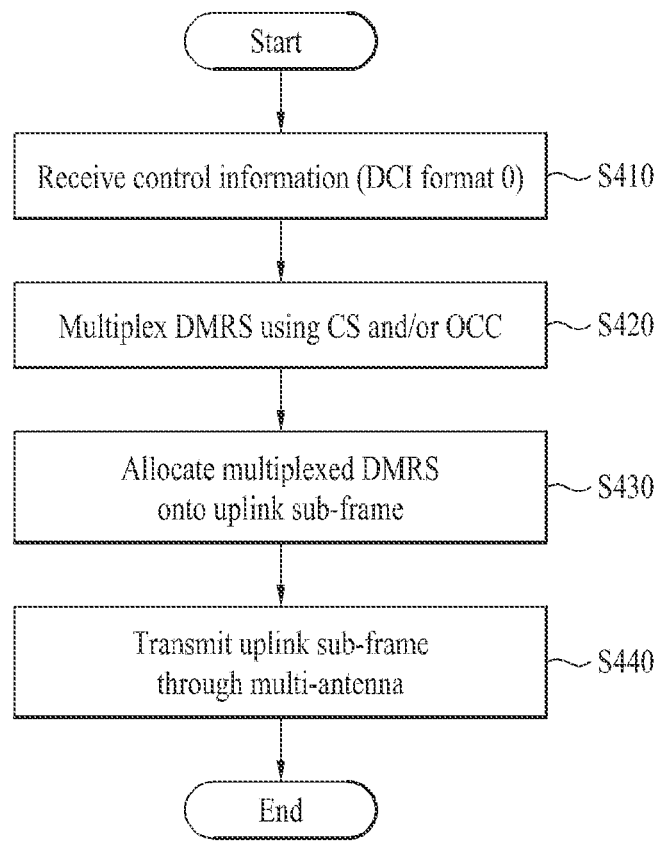
FIG. 4 is a flowchart illustrating a method for transmitting a reference signal in a terminal according to an exemplary embodiment of the present invention.

A description will be given of a method for transmitting a DMRS in a terminal according to an exemplary embodiment of the present invention with reference to FIG. 4.

The terminal may receive control information including information regarding CS resource allocation from the BS (S410). This control information may be CS information about a DMRS field of DCI format 0. The terminal may receive information on OCCs and implicitly acquire the information on OCCs from the CS information.

The terminal may multiplex DMRSs using CS resources allocated thereto and predetermined OCCs (S420). Specifically, the terminal can code-division-multiplex DMRSs of a plurality of layers (or antenna ports) using different CS resources. In addition, the terminal can code-division-multiplex the DMRSs using OCCs.

In the case of MU-MIMO, OCCs can be used as code resources for multiplexing DMRSs of terminals. For instance, if first and second terminals transmit signals to the BS through MU-MIMO, OCCs {1, 1} are applied to cyclic shifted DMRSs of the first terminal and OCCs {1, −1} are applied to cyclic shifted DMRSs of the second terminal such that the DMRSs of the first and second terminals can be multiplexed by means of the OCCs.

The terminal may allocate the multiplexed DMRSs onto an uplink subframe (S430) and transmit the subframe through multiple antennas (S440). The DMRSs may be mapped to the fourth symbol of each slot in the case of normal CP, as shown in FIG. 3.

Performance for Precoded DMRS

A description will be given of results of measurements of Block Error Rate (BLER) for precoded DMRSs in the case of a spatial multiplexing scheme with 4 Tx antennas and rank 3 with reference to FIG. 5.

On the assumption that output power of OFDM symbols of uplink subframes is restricted and only one symbol per slot is allocated for DMRS transmission, performance measurement was performed focusing on OCCs and potential channel estimation performance of an SIC channel estimator. For uplink precoded DMRSs, OCCs were applied to a second layer. Six repetitions were assumed for the SIC channel estimator. Simulation assumption and parameters are illustrated in Table 8.

TABLE 8

| Parameter | Assumption |
| --- | --- |
| Multiple Access Scheme | pure SC-FDMA |
| Carrier Frequency | 2 GHz |
| System Bandwidth | 5 MHz |
| Subframe length | 1.0 ms |
| Resource Allocation | Localized Mode 5 RBs |
| Frequency Hopping | Non-Slot Hopping |
| Modulation and Coding Rate | QPSK ½, 16QAM ½, 16QAM ¾ |
| Channel Coding | Turbo code: max-log-MAP |
| Channel Models | SCM-C (X pol) |
| Mobile Speed (km/h) | 3 km/h |
| Channel Estimation | DFT based channel estimation |
| Antenna configuration | 4 transmitter and 4 receiver (4Tx, 4Rx) |
| Number of Transmit rank | Rank 3 |
| Number of codeword | 2 |
| Layer mixing | SC-FDM symbol level |
| Transmission Scheme | Closed-loop Spatial Multiplexing |
| Codebook | Cubic metric friendly codebook for rank 3 [7] |
| Precoding | Single PMI |
| PMI update period | 2 TTI |
| Receiver Type | MMSE receiver |
| Cyclic shift value index | 0, 2, 4 |

Figure 5:
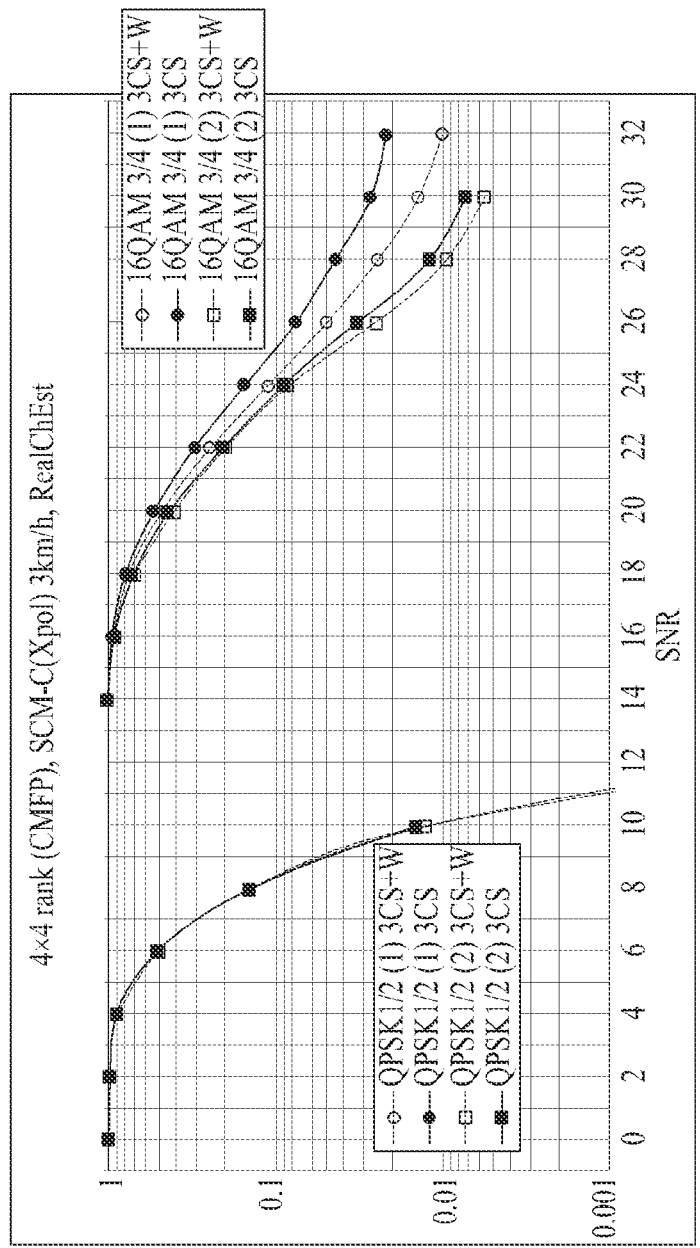
FIG. 5 is a graph showing BLER simulation results with respect to reference signals according to an exemplary embodiment of the present invention.

Left curves of the graph of FIG. 5 show results in the case in which DMRS multiplexing using 3 CS resources was applied to Quadrature Phase Shift Keying (QPSK) modulation scheme and DMRSs were precoded (W) and the case in which the DMRS multiplexing was performed and DMRSs were non-precoded. Right curves of the graph of FIG. 5 show results in the case in which DMRS multiplexing using 3 CS resources was applied to 64 Quadrature Amplitude Modulation (QAM) and DMRSs were precoded (W) and the case in which the DMRS multiplexing was performed and DMRSs were non-precoded.

As shown in FIG. 5, in the BLER performance of rank-3 spatial multiplexing using precoded DMRSs and channel estimation, the OCCs and SIC channel estimator do not largely affect the performance in a low-order modulation scheme whereas DMRS multiplexing using OCCs improves channel estimation performance in a high-order modulation scheme. Particularly, an OCC gain is decreased to below 10% error rate when the SIC channel estimator is used.

Cyclic Shift Separation Between Layers/Antennas

A description will be given of results of link level simulations in uplink SU-MIMO according to spacing between CSs with reference to FIGS. 6A and 6B. Simulation parameters are shown in Table 9.

TABLE 9

| Parameters | Value |
| --- | --- |
| Carrier Frequency | 2 GHz |
| # of used RB | 3RB (36 subcarriers) |
| Error Correction Coding | 3GPP Turbo |
| Code Rate | ½ |
| Modulation | QPSK |
| TERMINAL Velocity | 3 km/h |
| Channel Model | TU 6-ray |
| Channel Estimation | DFT based channel estimation |
| Number of Receive Antennas | 2 |
| Number of Transmit Antennas | 2 |
| Precoder | Identity 2 × 2 |

Figure 6:
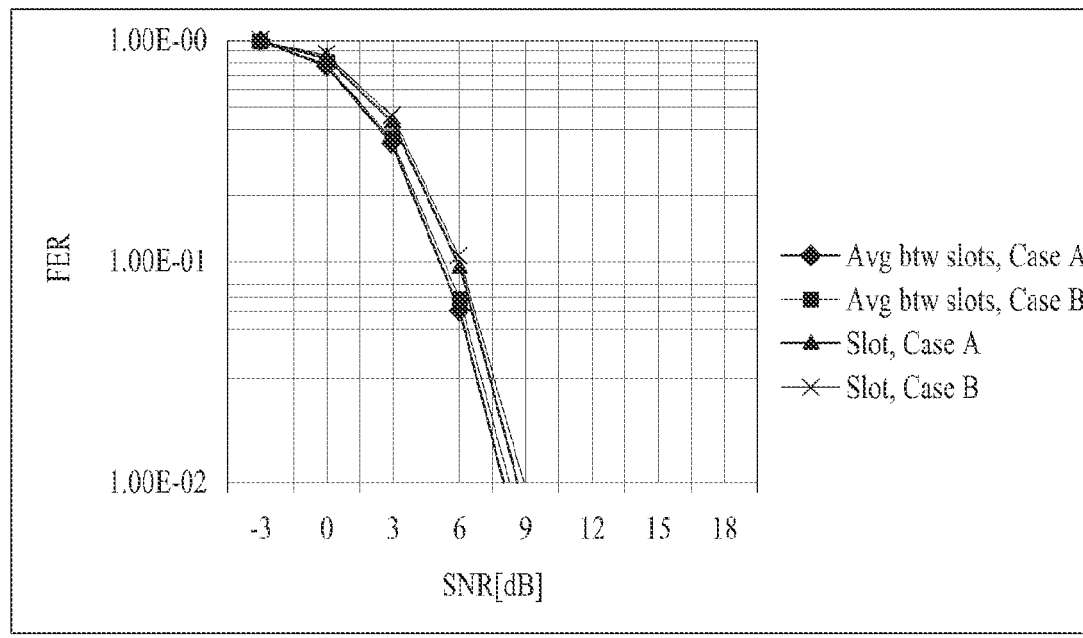
FIG. 6 is graphs showing FER and MSE simulation results with respect to reference signals according to an exemplary embodiment of the present invention.
Figure 6:
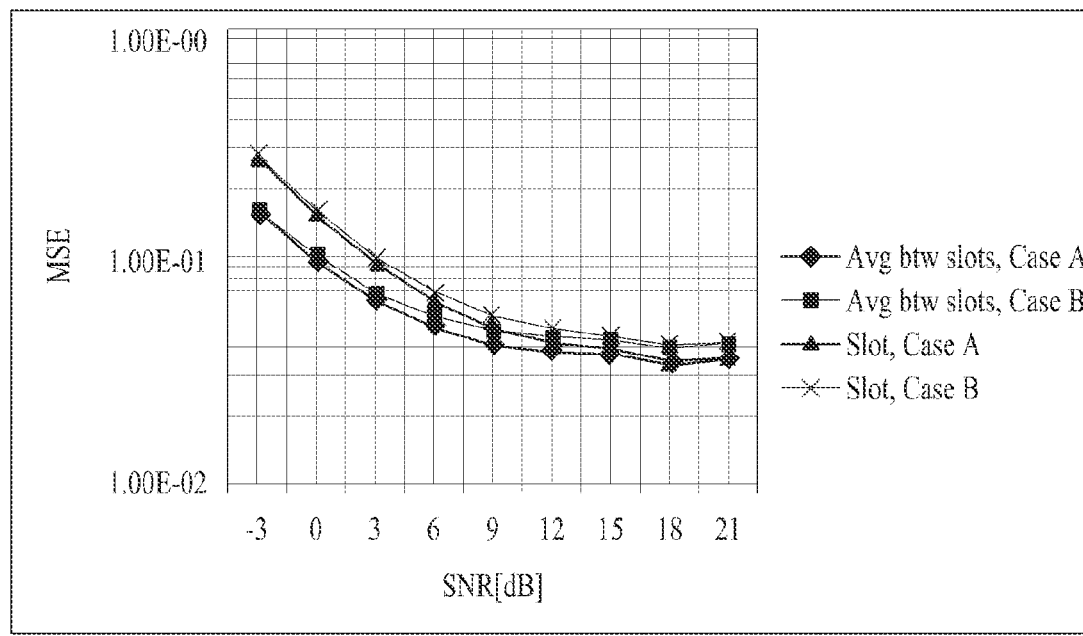

In FIGS. 6A and 6B, two cases Case A and Case B are assumed for the spacing between CSs. Case A is a case in which the spacing between CSs for DMRSs of layers corresponds to half an OFDM symbol length, which represents that orthogonal frequency codes are arranged over two consecutive subcarriers in the frequency domain. That is, this means that granularity of channel estimation is one per two subcarriers, approximately. Case B is a case in which the spacing between CSs for DMRSs of layers corresponds to ⅙ of the OFDM symbol length.

In the simulations, Frame Error Rates (FERs) and Means Square Error (MSEs) of Case A and Case B were compared with each other. FIG. 6A shows FERs for an average between slots and one slot in both Case A and Case B and FIG. 6B shows MSEs for an average between slots and one slot in both Case A and Case B.

Considering the spacing between CSs, the FER of Case A is similar to that of Case B in a low-order Modulation and Coding Scheme (MCS) such as QPSK 1/2. Comparing Case A to Case B, MSE is degraded as a CS separation degree increase. The influence of MSE degradation on the performance becomes severe as orders of SNR, MCS and MIMO increase. Therefore, it is desirable that CSs should be allocated to layers such that the spacing between CSs becomes a maximum value in uplink SU-MIMO.

As described above through the embodiments, the following can be considered in DMRS design for uplink transmission diversity and spatial multiplexing schemes in order to maximize the efficiency of uplink MIMO transmission. Up to two DMRS CS resources can be used for both 2 Tx antennas and 4 Tx antennas of uplink transmission diversity schemes. Highly dispersive CS resources can be preferably selected. Precoded DMRSs can be used for 4-Tx-antenna rank-3 SU-MIMO transmission in uplink spatial multiplexing schemes. DMRS multiplexing can be supported the spacing between CSs can be increased using OCCs among slots. In addition, interferences in multiplexing of a plurality of MU-MIMO terminals can be reduced using OCCs.

Figure 7:
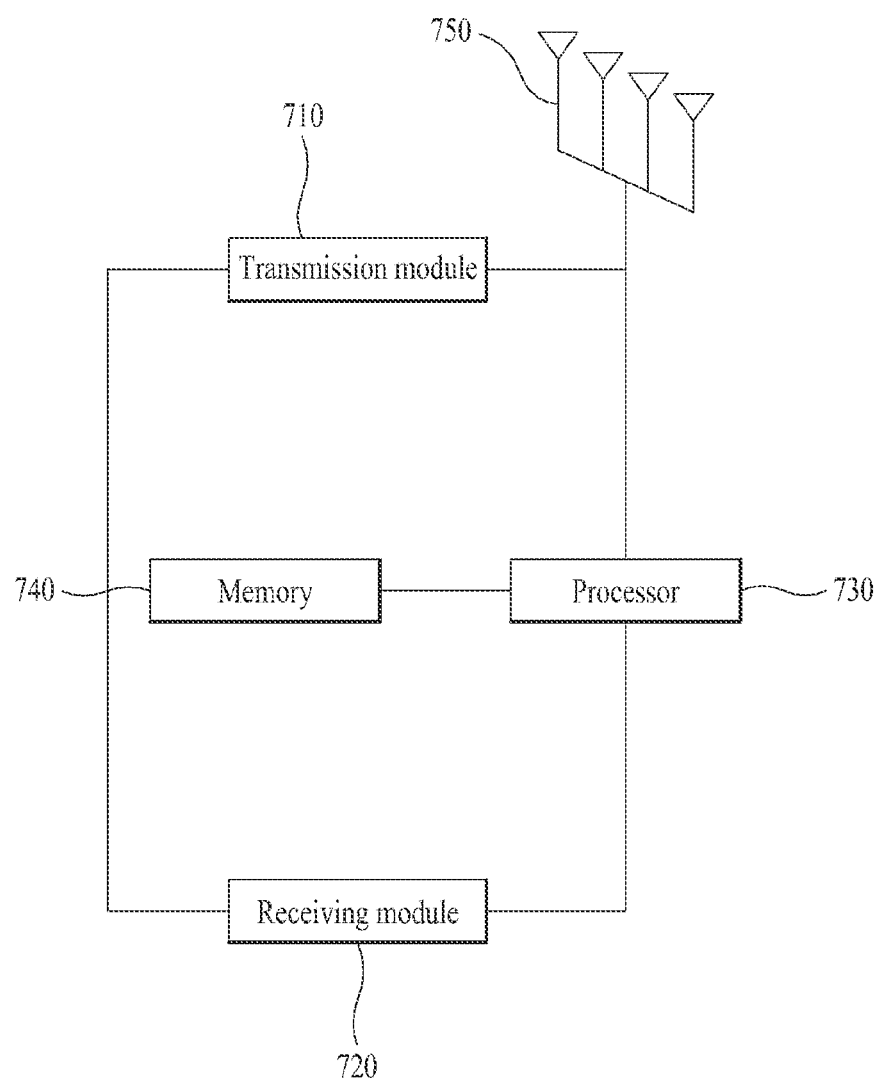
FIG. 7 shows the configuration of a terminal according to an exemplary embodiment of the present invention.

FIG. 7 shows the configuration of a terminal according to an exemplary embodiment of the present invention.

Referring to FIG. 7, the terminal includes a transmission module 710, a receiving module 720, a processor 730, a memory 740, and an antenna module 750.

The transmission module 710 may transmit signals, data and information to the BS over uplink. The receiving module 720 may receive signals, data and information from the BS over downlink. The processor 730 may control the overall operation of the TERMINAL including transmission and reception of signals, data and information through the transmission module 710 and the receiving module 720. The antenna module 750 may include a plurality of antennas. MIMO can be supported if at least one of a transmitter and a receiver includes a plurality of antennas.

The processor 730 may be configured to receive control information including information about CS resources through the receiving module 720, multiplex DMRSs for uplink MIMO transmission using the CS values and/or OCCs, allocate the multiplexed DMRSs onto an uplink subframe, and transmit the subframe through the transmission module 710 and the antennas of the antenna module 750. Here, if the uplink MIMO transmission corresponds to MU-MIMO transmission, DMRSs of the terminal and DMRSs of other terminals can be multiplexed by using OCCs.

In addition, the processor 730 may process information received by the terminal and information to be transmitted from the terminal. The memory 740 may store the processed information for a predetermined time and may be replaced by a component such as a buffer (not shown).

The embodiments of the present invention can be implemented by various means. For example, the embodiments of the present invention can be implemented by hardware, firmware, software, or combination thereof.

In a hardware configuration, the embodiments of the present invention may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, it will be obvious to those skilled in the art that claims that do not explicitly cite in each other in the appended claims may be presented in combination as an exemplary embodiment of the present invention or included as a new claim by subsequent amendment after the application is filed.

INDUSTRIAL APPLICABILITY

The above embodiments have been described, focusing on 3GPP LTE systems. However, the present invention is not limited thereto and can be applied in the same manner to methods for transmitting reference signals in a variety of mobile communication systems to which MIMO is applied.

The invention claimed is:

1. A method for transmitting an uplink signal at a terminal in a wireless communication system, the method comprising:
receiving, by the terminal from a base station, control information for a plurality of layers or antennas consisting of a first layer or antenna, a second layer or antenna, a third layer or antenna, and a fourth layer or antenna;
generating, by the terminal, a plurality of reference signals for uplink Multiple Input Multiple Output (MIMO) transmission using the control information;
precoding, by the terminal, the plurality of reference signals for spatial multiplexing; and
transmitting, by the terminal to the base station, the plurality of precoded reference signals via an uplink subframe via the plurality of layers or antennas, the uplink subframe consisting of two slots,
wherein the control information indicates that:
a first layer, a second layer, a third layer, and a fourth layer of the plurality of reference signals use an OCC value of 1 in the first slot of the uplink subframe;
the first and second layers of the plurality of reference signals use the OCC value of 1 in the second slot of the uplink subframe; and
the third and the fourth layers of the plurality of reference signals use an OCC value of −1 in the second slot of the uplink subframe, and
wherein the control information further indicates that:
the first layer of the plurality of reference signals uses a CS value of 0;
the second layer of the plurality of reference signals uses a CS value of 6;
the third layer of the plurality of reference signals uses a CS value of 3; and
the fourth layer of the plurality of reference signals uses a CS value of 9.

2. The method according to claim 1, wherein:
the CS and OCC values for the first and second layers of the plurality of reference signals are used by the terminal; and
the CS and OCC values for the third and fourth layers of the plurality of reference signals are used by another terminal.

3. The method according to claim 1, wherein the information on the OCC is implicitly acquired by the terminal from the information on the CS.

4. The method according to claim 1, wherein the information on the OCC is received by the terminal through L1/L2 control signaling or higher layer signaling.

5. The method according to claim 1, wherein the control information is included in a downlink control information format used for scheduling of physical uplink shared channels.

6. The method according to claim 1, wherein the plurality of reference signals are Demodulation Reference Signals (DMRSs).

7. A terminal transmitting an uplink signal in a wireless communication system, the terminal comprising:
a plurality of layers or antennas, the plurality of layers or antennas consisting of a first layer or antenna, a second layer or antenna, a third layer or antenna, and a fourth layer or antenna;
a receiving configured to receive a signal from a Base Station (BS) via the plurality of layers or antennas;
a transmitter configured to transmit a signal to the BS via the plurality of layers or antennas; and
a processor configured to control the terminal including the plurality of layers or antennas, the receiver and the transmitter,
wherein the processor is further configured to:
control the receiver to receive, from the BS, control information including information for the plurality of layers or antennas;
generate a plurality of reference signals for uplink Multiple Input Multiple Output (MIMO) transmission using the control information;
precode the plurality of reference signals for spatial multiplexing; and
control the transmitter to transmit, to the BS, the plurality of precoded reference signals via an uplink subframe via the plurality of layers or antennas, the uplink subframe consisting of two slots,
wherein the plurality of reference signals are precoded reference signals for spatial multiplexing of the plurality of layers or antennas,
wherein the control information indicates that:
a first layer, a second layer, a third layer, and a fourth layer of the plurality of reference signals use an OCC value of 1 in the first slot of the uplink subframe;
the first and second layers of the plurality of reference signals use the OCC value of 1 in the second slot of the uplink subframe; and
the third and fourth layers of the plurality of reference signals use an OCC value of −1 in the second slot of the uplink subframe, and
wherein the control information further indicates that:
the first layer of the plurality of reference signals uses a CS value of 0;
the second layer of the plurality of reference signals uses a CS value of 6;
the third layer of the plurality of reference signals uses a CS value of 3; and
the fourth layer of the plurality of reference signals uses a CS value of 9.

8. The terminal according to claim 7, wherein:
the CS and OCC values for the first and second layers of the plurality of reference signals are used by the terminal; and the CS and OCC values for the third and fourth layers of the plurality of reference signals are used by another terminal.

9. The terminal according to claim 7, wherein the information on the OCC is implicitly acquired by the terminal from the information on the CS.

10. The terminal according to claim 7, wherein the information on the OCC is received by the terminal through L1/L2 control signaling or higher layer signaling.

11. The terminal according to claim 7, wherein the control information is included in a downlink control information format used for scheduling of physical uplink shared channels.

12. The terminal according to claim 7, wherein the plurality of reference signals are Demodulation Reference Signals (DMRSs).

13. The method according to claim 1, wherein the plurality of reference signals are mapped to only one Single Carrier Frequency Division Multiple Access (SC-FDMA) symbol for each slot of the uplink subframe.

14. The method according to claim 13, wherein the plurality of reference signals for the plurality of layers or antennas are mapped to same consecutive subcarriers.

15. The terminal according to claim 7, wherein the plurality of reference signals are mapped to only one Single Carrier Frequency Division Multiple Access (SC-FDMA) symbol for each slot of the uplink subframe.

16. The terminal according to claim 15, wherein the plurality of reference signals for the plurality of layers or antennas are mapped to same consecutive sub carriers.

* * * * *